United States Patent
Suzuki

(10) Patent No.: US 7,573,612 B2
(45) Date of Patent: Aug. 11, 2009

(54) COLOR CONVERSION APPARATUS, COLOR CONVERSION METHOD AND COLOR CONVERSION PROGRAM

(75) Inventor: Yuusuke Suzuki, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 312 days.

(21) Appl. No.: 11/694,357

(22) Filed: Mar. 30, 2007

(65) Prior Publication Data
US 2008/0239402 A1 Oct. 2, 2008

(51) Int. Cl.
*G06T 1/00* (2006.01)
*G06K 1/00* (2006.01)
*G06K 9/00* (2006.01)
*H04N 1/46* (2006.01)

(52) U.S. Cl. .............. 358/1.9; 358/3.23; 358/525; 358/515; 358/518; 382/162; 382/167; 382/300

(58) Field of Classification Search ............... 358/1.9, 358/3.23, 525, 515, 518; 382/162, 167, 300
See application file for complete search history.

(56) References Cited

U.S. PATENT DOCUMENTS

| | | | | |
|---|---|---|---|---|
| 5,504,821 A | * | 4/1996 | Kanamori et al. | ........... 382/167 |
| 5,717,507 A | * | 2/1998 | Vondran, Jr. | ............... 358/525 |
| 5,900,860 A | * | 5/1999 | Ueda | ......................... 345/600 |

FOREIGN PATENT DOCUMENTS

| | | |
|---|---|---|
| JP | 11-031213 | 2/1999 |
| JP | 2002-237963 | 8/2002 |
| JP | 2005-354421 | 12/2005 |

\* cited by examiner

*Primary Examiner*—Edward L Coles
*Assistant Examiner*—Charlotte M Baker
(74) *Attorney, Agent, or Firm*—Turocy & Watson, LLP

(57) ABSTRACT

A technique is provided that can realize improvement in memory access efficiency and reduction in the processing volume in interpolation calculation with respect to color conversion processing using a two- or more-dimensional lookup table.

18 Claims, 17 Drawing Sheets

TRIANGULAR PYRAMIDAL
PATTERNS IN CUBIC LATTICE

PATTERN V

PATTERN VI

FIG.13

| C | M | Y | K |
|---|---|---|---|
| 2 BYTES | 2 BYTES | 2 BYTES | 2 BYTES |

FIG.14

$$X_{\chi \in \{C,M,Y,K\}} = \begin{cases} \begin{aligned} & \alpha V_\chi(r_n, g_n, b_n) \\ & + (V_\chi(r_{n+1}, g_n, b_n) - V_\chi(r_n, g_n, b_n))\Delta_{\delta r \delta g} \\ & + (V_\chi(r_{n+1}, g_n, b_{n+1}) - V_\chi(r_n, g_n, b_n))\Delta_{\delta g \delta b} \\ & + (V_\chi(r_{n+1}, g_{n+1}, b_{n+1}) - V_\chi(r_n, g_n, b_n))\delta b \end{aligned} & (\Delta_{\delta r \delta g} \geq 0, \Delta_{\delta g \delta b} \geq 0) \cdots (1) \\ \\ \begin{aligned} & \alpha V_\chi(r_n, g_n, b_n) \\ & + (V_\chi(r_{n+1}, g_n, b_{n+1}) - V_\chi(r_n, g_n, b_n))\Delta_{\delta g \delta r} \\ & + (V_\chi(r_{n+1}, g_n, b_{n+1}) - V_\chi(r_n, g_n, b_n))\Delta_{\delta r \delta b} \\ & + (V_\chi(r_{n+1}, g_{n+1}, b_{n+1}) - V_\chi(r_n, g_n, b_n))\delta b \end{aligned} & (\Delta_{\delta g \delta r} \geq 0, \Delta_{\delta r \delta b} \geq 0) \cdots (2) \\ \\ \begin{aligned} & \alpha V_\chi(r_n, g_n, b_n) \\ & + (V_\chi(r_{n+1}, g_n, b_{n+1}) - V_\chi(r_n, g_n, b_n))\Delta_{\delta g \delta b} \\ & + (V_\chi(r_{n+1}, g_{n+1}, b_{n+1}) - V_\chi(r_n, g_n, b_n))\Delta_{\delta b \delta r} \\ & + (V_\chi(r_{n+1}, g_{n+1}, b_{n+1}) - V_\chi(r_n, g_n, b_n))\delta r \end{aligned} & (\Delta_{\delta g \delta b} \geq 0, \Delta_{\delta b \delta r} \geq 0) \cdots (3) \\ \\ \begin{aligned} & \alpha V_\chi(r_n, g_n, b_n) \\ & + (V_\chi(r_n, g_{n+1}, b_n) - V_\chi(r_n, g_n, b_n))\Delta_{\delta b \delta g} \\ & + (V_\chi(r_n, g_{n+1}, b_{n+1}) - V_\chi(r_n, g_n, b_n))\Delta_{\delta g \delta r} \\ & + (V_\chi(r_{n+1}, g_{n+1}, b_{n+1}) - V_\chi(r_n, g_n, b_n))\delta r \end{aligned} & (\Delta_{\delta b \delta g} \geq 0, \Delta_{\delta g \delta r} \geq 0) \cdots (4) \\ \\ \begin{aligned} & \alpha V_\chi(r_n, g_n, b_n) \\ & + (V_\chi(r_n, g_{n+1}, b_n) - V_\chi(r_n, g_n, b_n))\Delta_{\delta b \delta r} \\ & + (V_\chi(r_{n+1}, g_{n+1}, b_n) - V_\chi(r_n, g_n, b_n))\Delta_{\delta r \delta g} \\ & + (V_\chi(r_{n+1}, g_{n+1}, b_{n+1}) - V_\chi(r_n, g_n, b_n))\delta g \end{aligned} & (\Delta_{\delta b \delta r} \geq 0, \Delta_{\delta r \delta g} \geq 0) \cdots (5) \\ \\ \begin{aligned} & \alpha V_\chi(r_n, g_n, b_n) \\ & + (V_\chi(r_{n+1}, g_n, b_n) - V_\chi(r_n, g_n, b_n))\Delta_{\delta r \delta b} \\ & + (V_\chi(r_{n+1}, g_{n+1}, b_n) - V_\chi(r_n, g_n, b_n))\Delta_{\delta b \delta g} \\ & + (V_\chi(r_{n+1}, g_{n+1}, b_{n+1}) - V_\chi(r_n, g_n, b_n))\delta g \end{aligned} & (\Delta_{\delta r \delta g} \geq 0, \Delta_{\delta b \delta g} \geq 0) \cdots (6) \end{cases}$$

INTERPOLATION CALCULATION FORMULA CORRESPONDING
TO EACH TRIANGULAR PYRAMIDAL AREA

FIG.15

$$X_{\chi \in \{C,M,Y,K\}} = X_{coeff\Delta_{\delta r \delta g}} * \Delta_{\delta r \delta g} + X_{coeff\Delta_{\delta g \delta b}} * \Delta_{\delta g \delta b} + X_{coeff\Delta_{\delta b \delta r}} * \Delta_{\delta b \delta r}$$
$$+ X_{coeff\Delta_{\delta r}} * \Delta_{\delta r} + X_{coeff\Delta_{\delta g}} * \Delta_{\delta g} + X_{coeff\Delta_{\delta b}} * \Delta_{\delta b}$$
$$+ X_{coeffconst}$$

$$= (X_{coeff\Delta_{\delta r \delta g}}, X_{coeff\Delta_{\delta g \delta b}}, X_{coeff\Delta_{\delta b \delta r}}, X_{coeff\Delta_{\delta r}}, X_{coeff\Delta_{\delta g}}, X_{coeff\Delta_{\delta b}}, X_{coeffconst}) \begin{pmatrix} \Delta_{\delta r \delta g} \\ \Delta_{\delta b \delta g} \\ \Delta_{\delta b \delta r} \\ \Delta_{\delta r} \\ \Delta_{\delta g} \\ \Delta_{\delta b} \\ 1 \end{pmatrix}$$

COEFFICIENT

FIG.16

| COEFFICIENT $\triangle$RG | COEFFICIENT $\triangle$GB | COEFFICIENT $\triangle$BR | CONSTANT TERM | COEFFICIENT $\triangle$R | COEFFICIENT $\triangle$G | COEFFICIENT $\triangle$B | 0 |
|---|---|---|---|---|---|---|---|
| 2BYTES | 2BYTES | 2BYTES | 2BYTES | 2BYTES | 2BYTES | 2BYTES | 2BYTES |

FIG.20
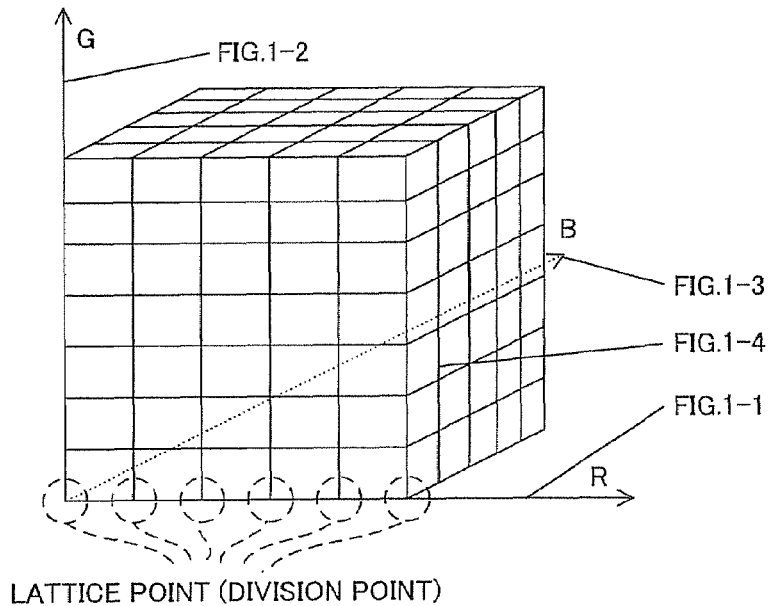
LATTICE POINT (DIVISION POINT)
FIG.21
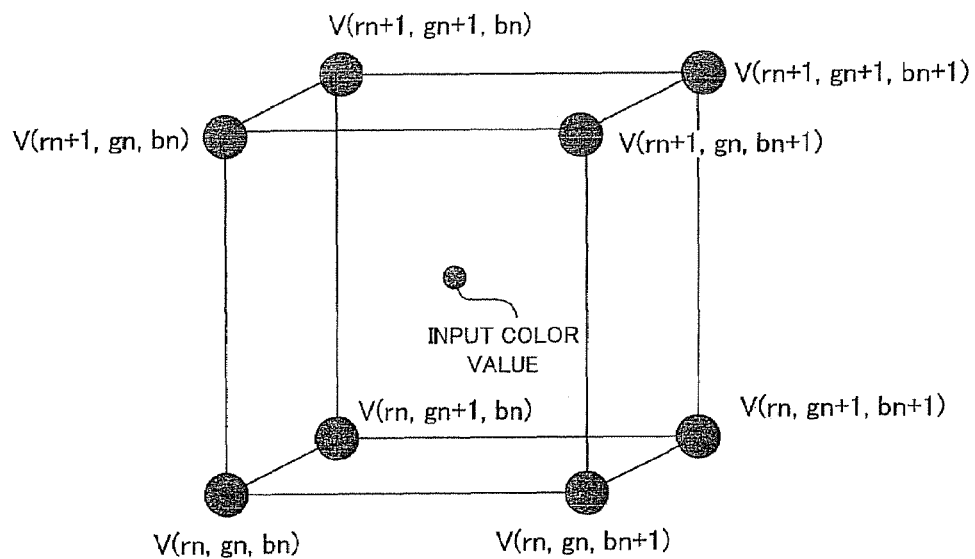
FIG.22
● $V(r_n, g_n, b_n) = \underbrace{(C_{r_n g_n b_n}, M_{r_n g_n b_n}, Y_{r_n g_n b_n}, K_{r_n g_n b_n})}_{\text{OUTPUT COLOR VALUE}}$

COLOR CONVERSION APPARATUS, COLOR CONVERSION METHOD AND COLOR CONVERSION PROGRAM

BACKGROUND OF THE INVENTION

1. Field of the Invention

The present invention relates to color conversion processing of image data, and particularly to a technique for improving the processing efficiency.

2. Description of the Related Art

For data that are handled in a display, printer, personal computer and the like, color information is managed in each peculiar color space. When sending and receiving data between different devices, it may be necessary to perform color conversion to the color spaces handled by the devices and color conversion processing that enables reflection of the featured of the devices. As color conversion processing, there has been known a conversion system that mainly uses numeric calculations with polynomials and determinants, and a conversion system that mainly refers to a table, such as a system that uses an n-dimensional lookup table to decide an output color for an n-component input.

These conversion systems are selected in accordance with the required color reproduction accuracy, speed and so on. In color conversion from an sRGB color space handled in a screen display of PC or the like to a peculiar RGB color space handled in a display, the system using a determinant is mainly employed. In color conversion from a color space of sRGB or CMYK handled at the time of application printing on PC to a CMYK color space peculiar to a printer, since nonlinear processing is often carried out and correction of a color of a particular hue can be made, the system referring to a table is mainly employed.

In color conversion processing using a multi-dimensional table in accordance with the table-referring system, the table size is too large if combinations output values corresponding to all the combinations of input values are stored. Therefore, a principally used method is to divide an input color space at equal spacing by lattice points (division points) for each color component, as shown in FIG. 20, then only storing output values of vertices of the lattice divided by the lattice points, and for an input value located between lattice points, calculating an output value by interpolation with the values of the lattice points forming the lattice to which the input value belongs (see FIG. 21 and FIG. 22). The data format of the multi-dimensional lookup table is generally supported by the standard format of the ICC profile prescribed by the International Color Consortium (ICC), and it is also supported as apart of the Color Rendering Dictionary (CRD) of Postscript, which is a kind of page description language used to describe printer data. In these formats, output value data (CMY, CMYK and so on) corresponding to lattice points (RGB and so on) that divide the coordinate axes of each color component in the input color space are arrayed and managed on a memory area in ascending order of coordinate values of respective component coordinates in the input color space (see FIG. 12).

In the color conversion processing using the above multi-dimensional color conversion lookup table (LUT), an output value of color conversion processing is calculated by interpolation based on the color value in the input color space and the output value stored on the multi-dimensional LUT.

As interpolation methods in this calculation, a "four-point interpolation method" and an "eight-point interpolation method" are often used. In the eight-point interpolation method, interpolation is made by using an input value and output values corresponding to eight lattice points located at all the vertices of the lattice to which the input value belongs in the input color space (see FIG. 4). In the four-point interpolation method, interpolation is made by using an input value and output values corresponding to four lattice points selected from the eight lattice points of the lattice to which the input value belongs in the input color space.

In the color conversion processing based on interpolation using the multi-dimensional LUT as described above, the data size of the LUT can be restrained to a certain extent and the degree of tint correction or the like can be finely adjusted. However, in the case of realizing the color conversion processing on software, the volume of data to be handled and the quantity of calculation processing are larger than in the case of using a determinant, and processing is slower than the color conversion processing that mainly uses calculations. Therefore, it takes a long processing time to process image data of a large data size.

A configuration to solve this problem of processing time by using hardware having a CPU, a memory and a cache memory, and the four-point interpolation method (FIG. 23 and FIG. 24). Here, a CPU 901 is assumed to have a register 902 to store data that is used for calculations. A cache memory 904 has a smaller capacity than a main memory 908 but its access speed from the CPU 901 is higher than that of the main memory 908, and data handled at a time in processing of a program is limited to one place on its memory area. Thus, the cache memory is hardware to increase the program execution speed by utilizing the locality of data. Here, it is assumed that four lattice points to be used in the four-point interpolation method are selected as shown in FIG. 6.

The four-point interpolation includes processing to load data of four colors on the LUT to the register 902 in order to calculate them in the CPU 901. In this processing, in loading the first color V(rn, gn, bn) of the four colors (the colors at four lattice points) to the register 902, a command to load data at a memory address where V(rn, gn, bn) is stored, is used (FIG. 23 (1)). Here, the memory controller searches for whether the data of the address which the CPU 901 tries to access is in the cache memory 904 or not. In this case, since V(rn, gn, bn) is accessed for the first time, it does not exist in the cache memory 904. The memory controller collectively loads continuous data including the address of V(rn, gn, bn) from the main memory 908 into the cache memory 904 (FIG. 23 (2) and (3)) and the data is loaded to the register 902 (FIG. 23 (4)). Next, the program loads the next color V(rn, gn, bn+1) (FIG. 24). This data is arranged next to V(rn, gn, bn) in the main memory 908. In accordance with a loading command for this data (FIG. 24 (1)), the memory controller searches for whether the data is in the cache memory 904 or not. Here, it is assumed that the color value data V(rn, gn, bn+1) has been collectively copied together with the previous color value data V(rn, gn, bn) to the cache memory 904. As a result of the search, it is found that V(rn, gn, bn+1) exists in the cache memory 904, and it is copied from the cache memory 904. As a result, the execution of the program is shortened by the data loading time from the main memory 908 to the cache memory 904. This shortening time varies depending on the hardware, and there is a time difference of several times to several ten times.

Moreover, the third color V(rn+1, gn, bn) is loaded to the register 902. As shown in FIG. 12, this data is arranged at an address that is neither next to V(rn, gn, bn) nor to V(rn, gn, bn+1) in the main memory 908. The probability that this data have been copied to the cache memory 904 together with the previously loaded data of two colors, is extremely low. Here, it is assumed that the color value V(rn+1, gn, bn) has not been copied to the cache memory 904 in the previous data loading of the two colors. In this processing, the color value V(rn+1, gn, bn) is loaded from the main memory 908. Finally, a color value V(rn, gn+1, bn+1) is loaded to the register 902. For the same reason as the third color, the possibility that this data has been copied to the cache memory 904 is low, and it is loaded from the main memory 908.

In this manner, the data management structure of the cache memory is one-dimensional, and in the case of loading the multi-dimensional LUT, the cache works only partly and the program processing speed cannot be improved sufficiently. This problem becomes more prominent when the number of data on the multi-dimensional LUT is increased (the division space by lattice points is narrowed) in order to make more detailed color adjustment.

SUMMARY OF THE INVENTION

It is an object of an embodiment of this invention to provide a technique that can realize improvement in memory access efficiency and reduction in the processing volume in interpolation with respect to color conversion processing using a two- or more-dimensional lookup table.

To solve the above problem, a color conversion apparatus according to the present invention is a color conversion apparatus in which, in accordance with an n-dimensional lookup table that stores a color conversion value corresponding to each of division points dividing each color component axis in a first color space realized by n types (n is an integer of one or larger) of color components, into plural sections, and thereby dividing the first color space into plural areas, a color value of a point belonging to the first color space is converted to a color value of a point belonging to a second color space. The apparatus includes: a color value acquiring unit configured to acquire a color value of a point belonging to the first color space that is to be a target of color conversion; a reference area determining unit configured to determine an area to which the point to be the target of color conversion belongs, from the plural areas in the first color space, in accordance with the color value acquired by the color value acquiring unit; a small area determining unit configured to, in the case where the area determined by the reference area determining unit is divided into plural areas having, as vertices, division points less than $2^n$ of $2^n$ division points forming the area, determine which one of the plural small areas the point to be the target of color conversion belongs to; a color conversion value acquiring unit configured to acquire a color conversion value associated with a division point forming the area determined by the small area determining unit, from a predetermined memory area; and an interpolating unit configured to interpolate the color value of the point belonging to the second color space corresponding to the color value of the point belonging to the first color space in accordance with the color conversion value acquired by the color conversion value acquiring unit. Plural color conversion values associated respectively with the plural division points forming the small area in the three-dimensional lookup table are stored in the predetermined memory area with their storage addresses next to each other.

Also, a color conversion method according to the present invention is a color conversion method in which, in accordance with an n-dimensional lookup table that stores a color conversion value corresponding to each of division points dividing each color component axis in a first color space realized by n types (n is an integer of one or larger) of color components, into plural sections, and thereby dividing the first color space into plural areas, a color value of a point belonging to the first color space is converted to a color value of a point belonging to a second color space. The method includes the steps of: acquiring a color value of a point belonging to the first color space that is to be a target of color conversion; determining an area to which the point to be the target of color conversion belongs, from the plural areas in the first color space, in accordance with the color value acquired in the step of acquiring the color value; in the case where the area determined in the step of determining the area is divided into plural areas having, as vertices, division points less than $2^n$ of $2^n$ division points forming the area, determining which one of the plural small areas the point to be the target of color conversion belongs to; acquiring a color conversion value associated with a division point forming the area determined in the step of determining the small area, from a predetermined memory area; and interpolating the color value of the point belonging to the second color space corresponding to the color value of the point belonging to the first color space in accordance with the color conversion value acquired in the step of acquiring the color conversion value. Plural color conversion values associated respectively with the plural division points forming the small area in the n-dimensional lookup table are stored in the predetermined memory area with their storage addresses next to each other.

Also, a color conversion program according to the present invention is a color conversion program that causes a computer to execute processing in which, in accordance with an n-dimensional lookup table that stores a color conversion value corresponding to each of division points dividing each color component axis in a first color space realized by n types (n is an integer of one or larger) of color components, into plural sections, and thereby dividing the first color space into plural areas, a color value of a point belonging to the first color space is converted to a color value of a point belonging to a second color space. The program causes the computer to execute the steps of: acquiring a color value of a point belonging to the first color space that is to be a target of color conversion; determining an area to which the point to be the target of color conversion belongs, from the plural areas in the first color space, in accordance with the color value acquired in the step of acquiring the color value; in the case where the area determined in the step of determining the area is divided into plural areas having, as vertices, division points less than $2^n$ of $2^n$ division points forming the area, determining which one of the plural small areas the point to be the target of color conversion belongs to; acquiring a color conversion value associated with a division point forming the area determined in the step of determining the small area, from a predetermined memory area; and interpolating the color value of the point belonging to the second color space corresponding to the color value of the point belonging to the first color space in accordance with the color conversion value acquired in the step of acquiring the color conversion value. Plural color conversion values associated respectively with the plural division points forming the small area in the n-dimensional lookup table are stored in the predetermined memory area with their storage addresses next to each other.

DESCRIPTION OF THE DRAWINGS

FIG. 13 is a view for explaining loading of LUT data to a register.

FIG. 14 is a view showing a typical interpolation formula based on a color value.

FIG. 15 is a view showing an interpolation formula with coefficients monistically managed.

FIG. 16 is a view showing an example of data arrangement of coefficient data and the like stored in a memory 906 for each output color component.

FIG. 20 is a view showing a state where an input color space is divided at equal spacing by lattice points (division points) for each color component.

FIG. 21 is a view for explaining interpolation.

FIG. 22 is a view for explaining interpolation.

DESCRIPTION OF THE EMBODIMENTS

Hereinafter, embodiments of the invention will be described with reference to the drawings.

First Embodiment

First, a first embodiment of the invention will be described.

Figure 1:
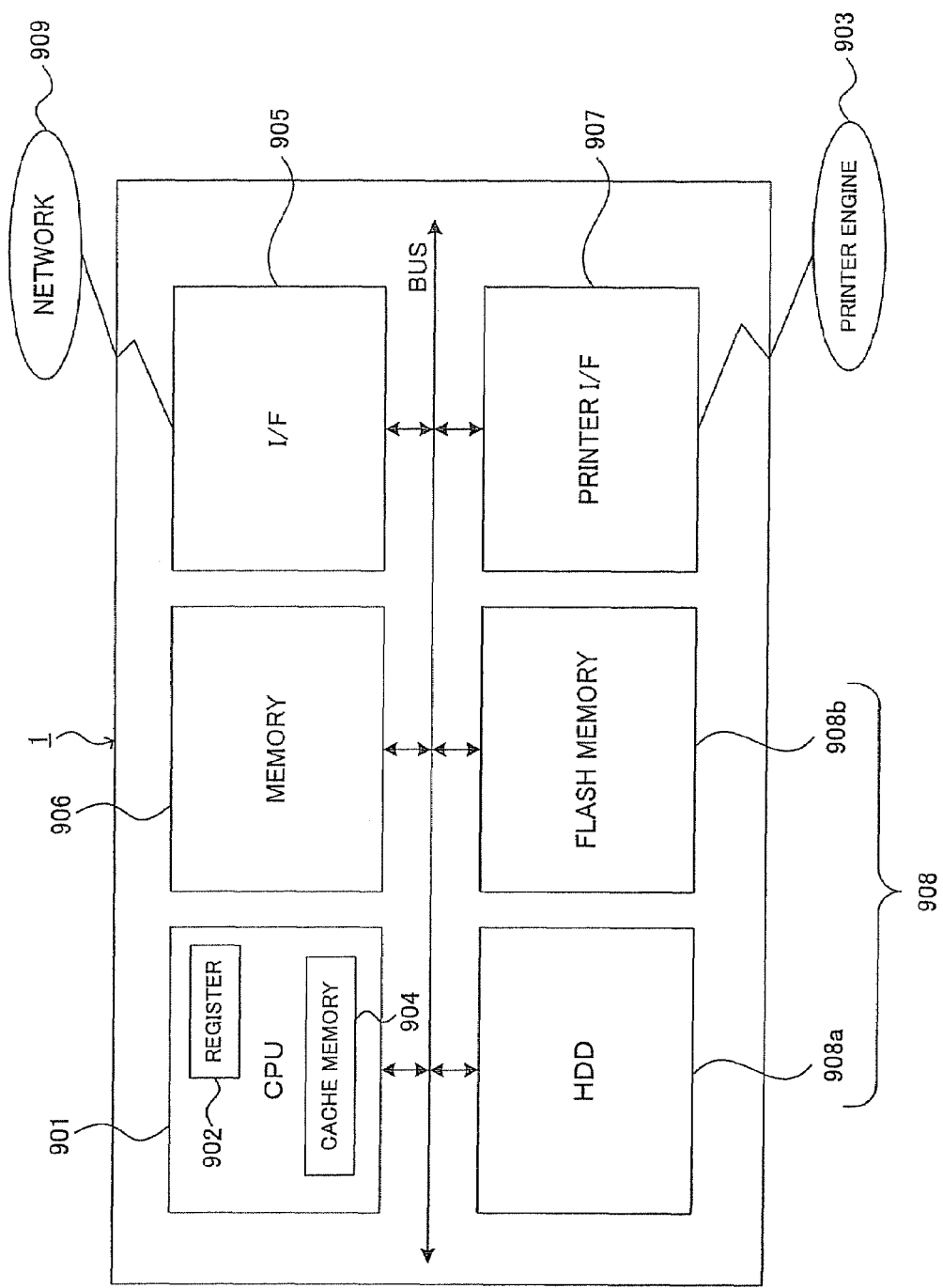
FIG. 1 is a block diagram showing the hardware configuration of a color conversion apparatus according to a first embodiment of the invention.

FIG. 1 is a block diagram showing the hardware configuration of a color conversion apparatus according to the first embodiment of the invention.

A color conversion apparatus 1 has a CPU 901, a register 902, a cache memory 904, an I/F 905, a memory 906, a printer I/F 907, an HDD 908a, and a flash memory 908b.

The CPU 901 has the register (a memory accessible at a high speed from the CPU 901 than from the cache memory 904 and the memory 906) 902 and the cache memory 904, and carries out arithmetic processing related to color conversion processing.

In the cache memory 904 and the memory 906, "input color value", "color conversion LUT" and "color conversion values stored in the LUT" related to the arithmetic processing at stored at the time of calculations in color conversion processing.

The HDD 908a and the flash memory 908b are non-volatile memory media and data of the lookup table are stored therein. The table data of the lookup table can also be acquired from a network 909 via the I/F 905.

Also, the color conversion apparatus 1 according to this embodiment is connected with an image forming apparatus such as a printer in a manner that allows communications between them. Image data expressed in a second color space, acquired as a result of the color conversion processing by the color conversion apparatus 1, is outputted to a printer engine 903 via the printer I/F 907 and image forming processing based on the outputted image data can be carried out. The hardware units provided in the color conversion apparatus 1 are interconnected via a bus in a manner that allows communications between them.

The CPU 901 is responsible for carrying out various kinds of processing in the color conversion apparatus and is also responsible for realizing various functions by executing programs stored in the memory 906. The memory 906 is formed by, for example, a ROM or RAM, and is responsible for storing various kinds of information and programs to be used in the color conversion apparatus.

Figure 2:
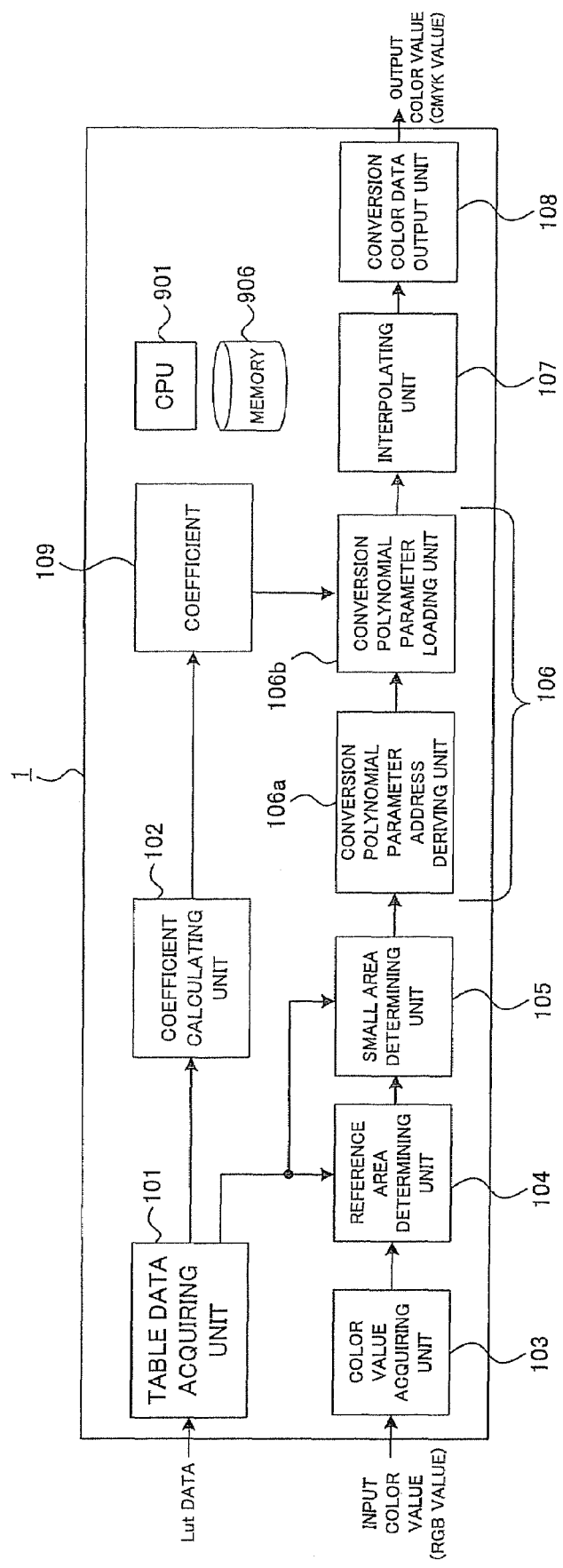
FIG. 2 is a functional block diagram for explaining the color conversion apparatus according to the embodiment.

FIG. 2 is a functional block diagram for explaining the color conversion apparatus according to this embodiment.

The color conversion apparatus 1 according to this embodiment has the function of converting the color value of a point belonging to a first color space to the color value of a point belonging to a second color space in accordance with an n-dimensional lookup table. The n-dimensional lookup table mentioned here stores, as table data, "color conversion values (numeric values used in calculations of color conversion processing)" associated respectively with "division points" that divide each color component axis in the "first color space" expressed by n kinds (n is an integer of one or larger) of color components, into plural sections, and thereby divide the first color space into plural areas.

The first and second color spaces mentioned here may be, for example, a RGB color space, CMY color space, CMYK color space, Lab color space, Luv color space, Adobe (trademark registered) RGB color space and sRGB color space, and so on. Hereinafter, this embodiment will be described using a case where the first color space is an "RGB color space" and the second color space is a "CMYK color space". In this case, since the color components in the first color space are three-dimensional, also the lookup table used for color conversion processing is three-dimensional (n=3).

Specifically, the color conversion apparatus 1 according to this embodiment has a table data acquiring unit 101, a coefficient calculating unit 102, a color value acquiring unit 103, a reference area determining unit 104, a small area determining unit 105, a color conversion value acquiring unit 106 (a conversion polynomial parameter address deriving unit 106a and a conversion polynomial parameter loading unit 106b), an interpolating unit 107, a conversion color data output unit 108, a coefficient storing unit 109, the CPU 901, and the memory 906.

The table data acquiring unit 101 acquires a color conversion value stored in a three-dimensional lookup table (a data table including three component axes, that is, R-component axis, G-component axis and B-component axis) from a main memory 908.

The coefficient calculating unit 102 has the function of calculating a "coefficient" (which will be described later in detail) on the basis of the color conversion value acquired by the table data acquiring unit 101.

The coefficient calculated by the coefficient calculating unit 102 is stored into the memory 906 by the coefficient storing unit 109.

The color value acquiring unit 103 acquires the color value (input color value) of a point to be a target of color conversion belonging to the RGB color space.

The reference area determining unit 104 determines an area to which the point to be a target of color conversion belongs, of plural areas in the RGB color space, on the basis of the color value acquired by the color value acquiring unit 103. Here, since the lookup table is three-dimensional, the area determined by the reference area determining unit is a cubic area (cubic lattice).

The small area determining unit 105, in the case where the area determined by the reference area determining unit 104 is divided into plural small areas having, as vertices, division points (for example, six or four division points) less than $2^n$ of $2^n$ division points (here, it is eight division points because n=3), determines which of plural small areas the point to be a target of color conversion belongs. In this case, the small area determining unit determines a triangular pyramidal area (small area) having four division points (lattice points) as vertices (the four-point interpolation method will be described later in detail).

The color conversion value acquiring unit 106 acquires the color conversion values associated with the division points forming the area determined by the small area determining unit 105, for example, from the main memory 908 (predetermined memory area). The plural color conversion values associated respectively with the plural division points forming the triangular pyramidal area in the three-dimensional lookup table in this case are stored in the main memory 908, with their storage addresses next to each other.

Specifically, the conversion polynomial parameter loading unit 106b acquires an address for reading out a coefficient to be used for interpolation calculation to carry out this four-point interpolation, from the coefficient storing unit 109, and loads the coefficient in accordance with an address derived by the conversion polynomial parameter address deriving unit 106a.

In this embodiment, since the color space of output values (the second color space) is a CMYK color space, four LUTs are stored in the main memory 908, that is, a C-value conversion LUT, an M-value conversion LUT, a Y-value conversion LUT and a K-value conversion LUT corresponding to the color components of the CMYK color space. Here, in the case where the color space of output values has three types of color components as in a CMY color space, three types of conversion LUTs are prepared. In the case where the color space of output values has seven types of color components as in a CMYRGBK color space, seven types of conversion LUTs are prepared.

The interpolating unit 107 interpolates the color value of a point belonging to the CMYK color space that corresponds to the color value (input color value) of a point belonging to the RGB color space on the basis of the color conversion values acquired by the color conversion value acquiring unit 106. The interpolating unit 107 in this embodiment carries out interpolation calculation of the color value of a point belonging to the CMYK color space by using an arithmetic formula that is the same except for the coefficient with respect to each of the plural small areas, on the basis of the color value of the point to be a target of color conversion belonging to the RGB color space and the color conversion values associated with the plural division points forming the vertices of the plural triangular pyramidal areas. The "color conversion value" mentioned here is the "coefficient" in the arithmetic formula.

The conversion color data output unit 108 outputs image data expressed in the CMYK color space calculated by the interpolating unit 107.

Now, the four-point interpolation method employed in a traditional color conversion apparatus will be briefly described.

Figure 3:
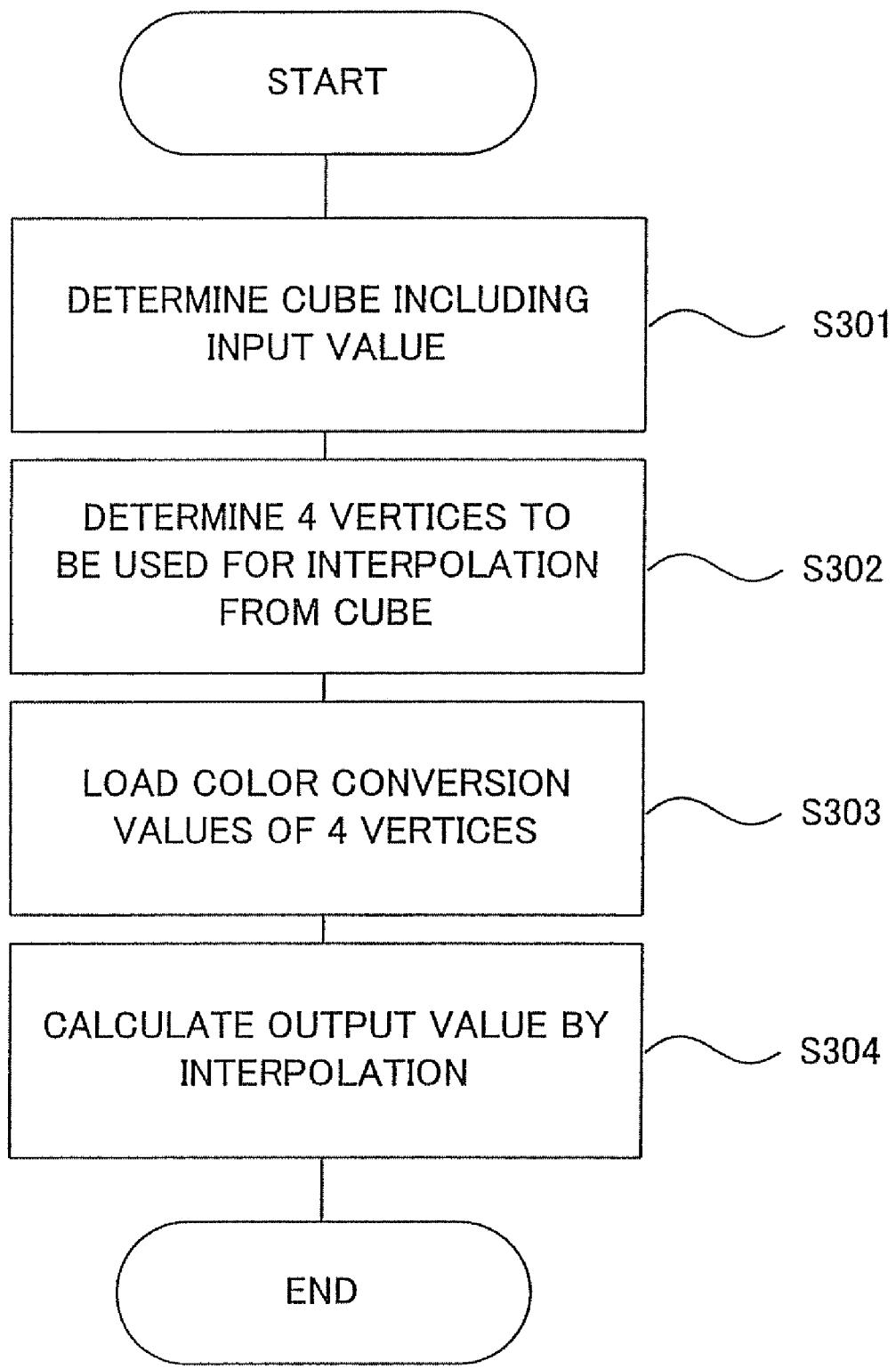
FIG. 3 is a flowchart showing an example of color conversion processing using an n-dimensional lookup table in accordance with the four-point interpolation method.

As an example of color conversion processing using an n-dimensional lookup table based on the four-point interpolation method, there is a method of realizing color conversion by the processing as shown in FIG. 3.

Figure 4:
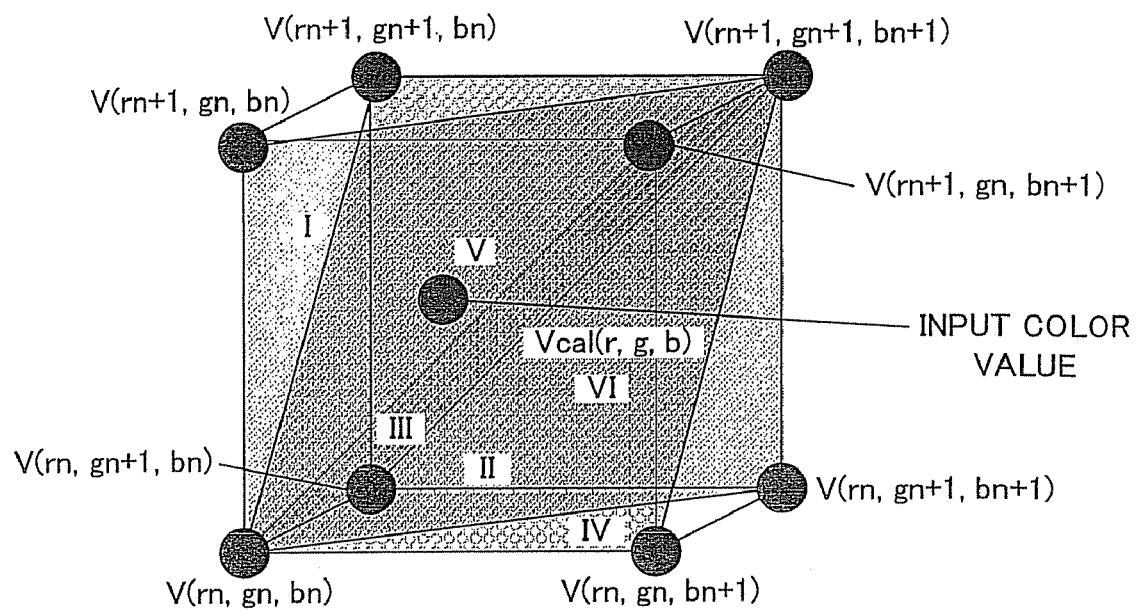
FIG. 4 is a view showing division points that are vertices of a cubic lattice surrounding a point of an input color value in an input color space.

First, in an input color space as shown in FIG. 4, color values in a three-dimensional LUT corresponding to division points (eight points) as vertices of a cubic lattice surrounding a point of input color value are determined by calculation processing (S301).

Next, it is determined which four vertices of the eight division points should be used for the four-point interpolation (S302).

Figure 5:
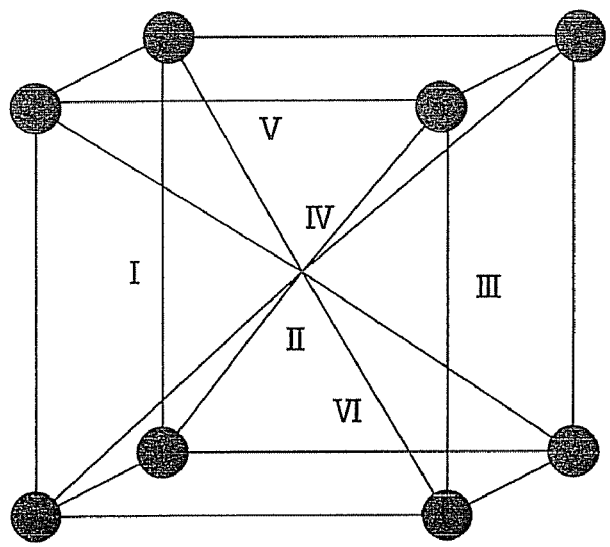
FIG. 5 is a view showing a state where a cubic lattice including eight vertices is divided into plural triangular pyramidal areas.
Figure 6:
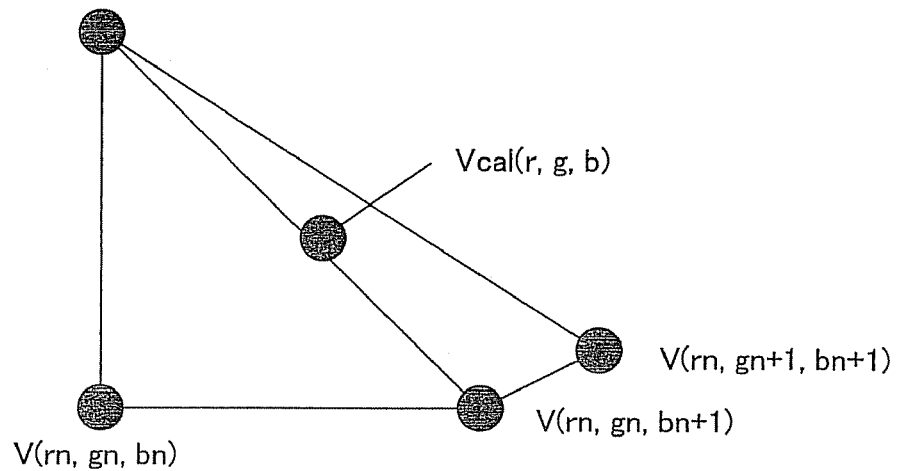
FIG. 6 is a view for explaining plural triangular pyramidal areas.
Figure 7:
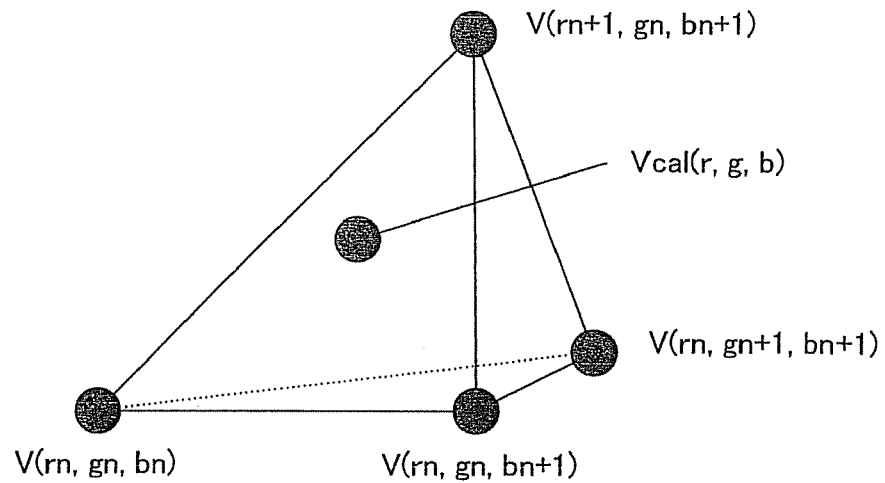
FIG. 7 is a view for explaining plural triangular pyramidal areas.
Figure 8:
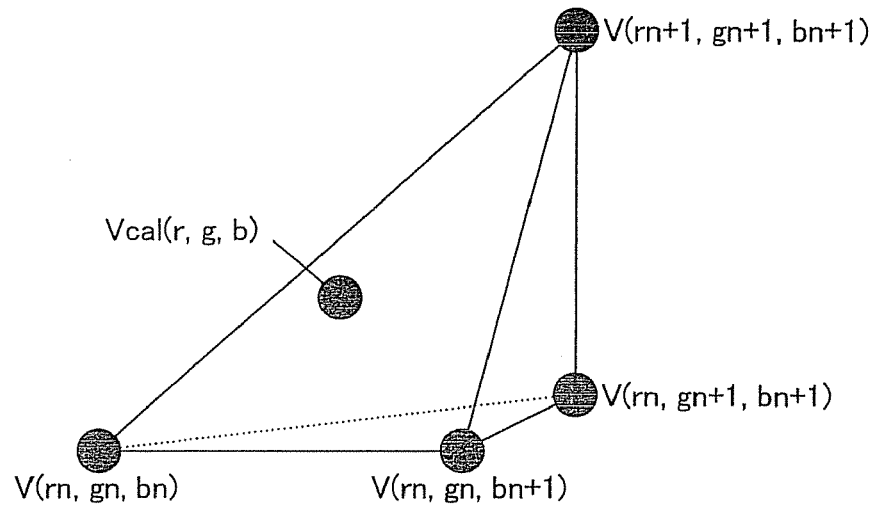
FIG. 8 is a view for explaining plural triangular pyramidal areas.
Figure 9:
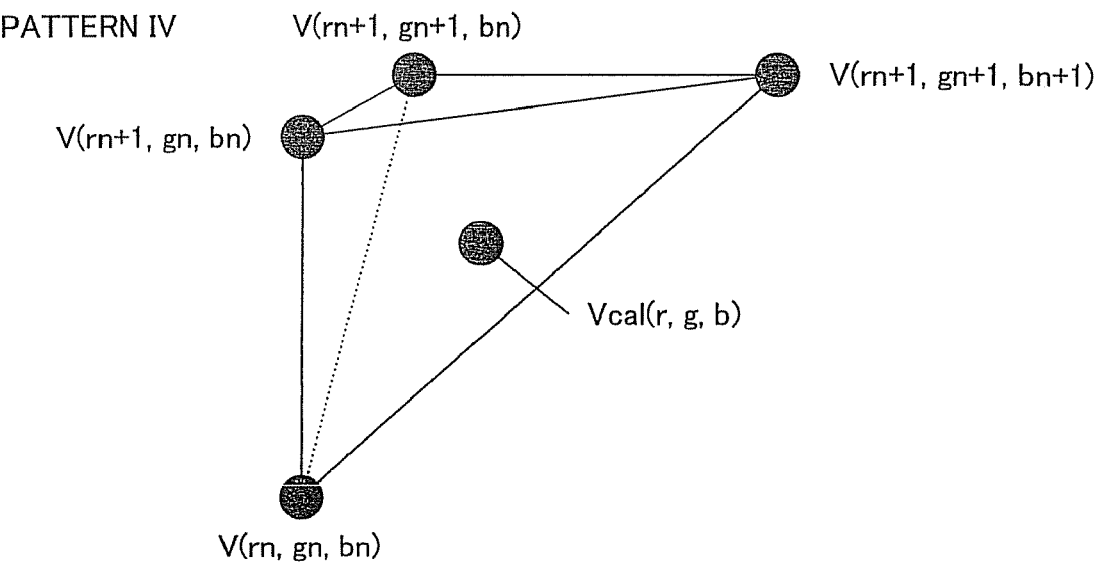
FIG. 9 is a view for explaining plural triangular pyramidal areas.
Figure 10:
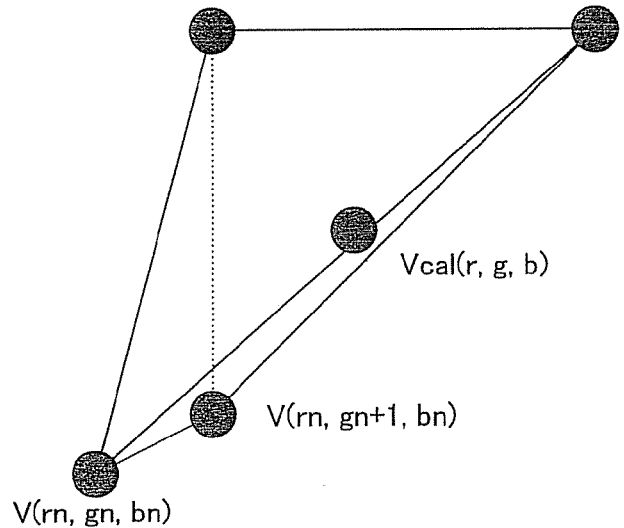
FIG. 10 is a view for explaining plural triangular pyramidal areas.
Figure 11:
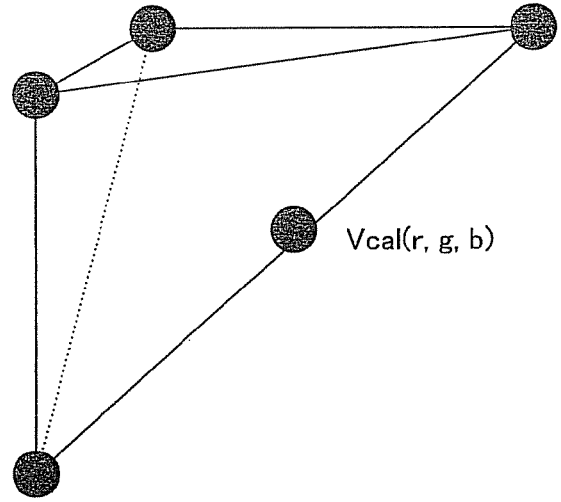
FIG. 11 is a view for explaining plural triangular pyramidal areas.

Here, the cubic lattice including the reference eight vertices is divided into plural triangular pyramidal areas, each of which includes four points of the eight vertices, as shown in FIG. 5. It is determined which of these plural triangular pyramidal areas the input color value belongs, by comparative calculation of the input color value with the color values of the vertices. Four division points (vertices) on the lookup table have been allocated in advance to each of the triangular pyramidal areas, as shown in FIG. 6 to FIG. 11. In FIG. 6 to FIG. 11, each triangular pyramidal area includes four division points on the multi-dimensional LUT. However, the division points are not limited to these and division points that area not included in the triangular pyramidal area can also be allocated.

In this manner, the four colors (four vertices) on the LUT used for interpolation are decided by the determination of the triangular pyramidal area to which the input color value belongs.

Figure 12:
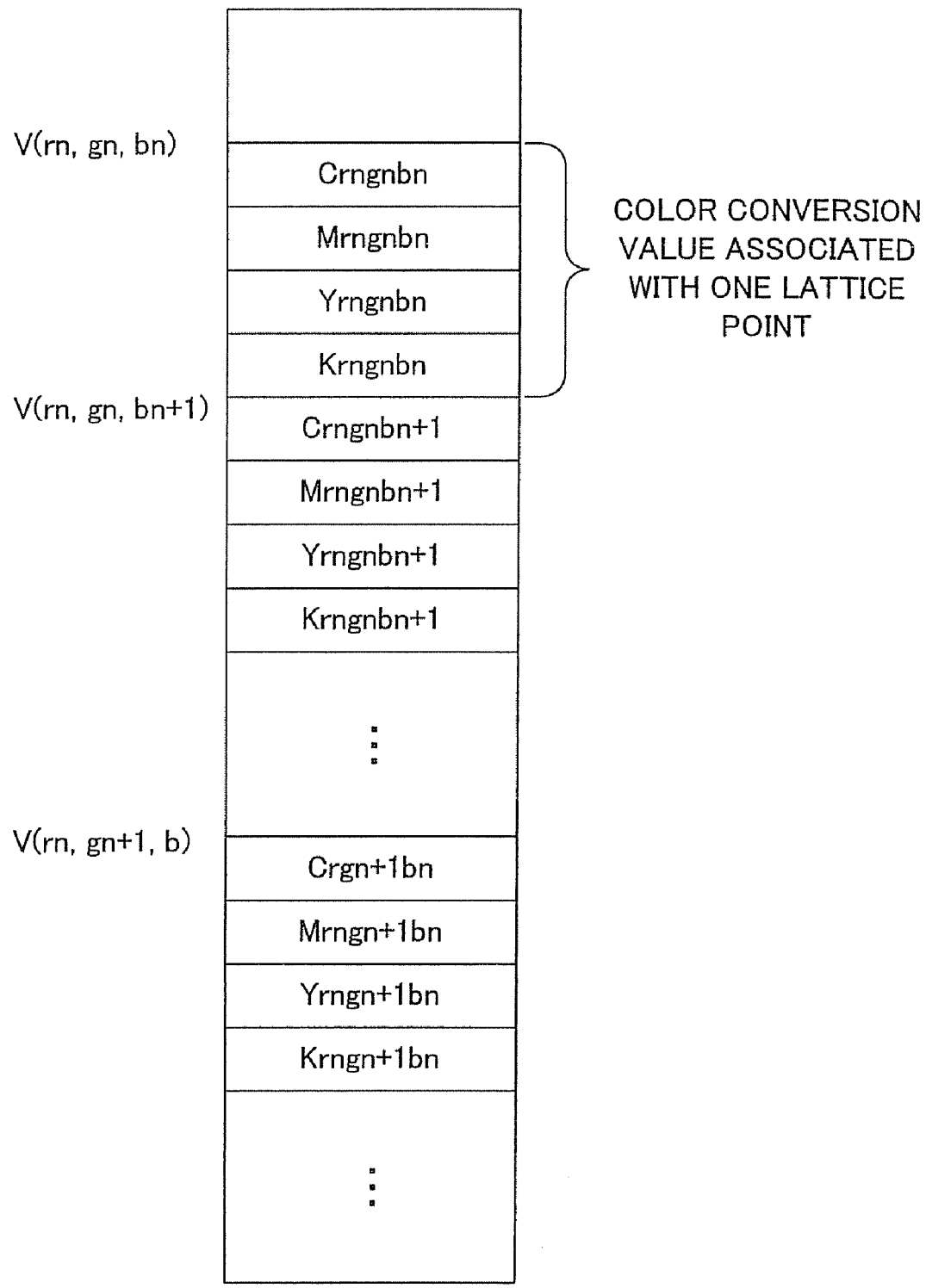
FIG. 12 is a view showing data arrangement of three-dimensional LUT data.

Next, the color conversion values corresponding to the decided four colors are acquired from the three-dimensional LUT data stored in the data arrangement as shown in FIG. 12 in the main memory, and are loaded to the register (S303) (FIG. 13).

By the above processing, all the necessary data for carrying out the four-point interpolation are acquired. As the acquired data are provided as input values in interpolation calculation formulas shown in FIG. 14, an output color value is calculated (S304). The formulas (1) to (6) shown in FIG. 14 correspond respectively to the plural triangular pyramidal areas acquired by the division of the cubic lattice, which is described before, and these formulas may be selected in accordance with the result of selection of four vertices.

In this manner, as the color conversion processing using the multi-dimensional LUT based on the "four-point interpolation method" is employed, the number of colors used in interpolation calculation is reduced and the burden of arithmetic processing can be reduced, compared with the case where the "eight-point interpolation method" is employed.

Next, the interpolation calculation processing in the color conversion apparatus according to this embodiment will be described in detail.

The coefficient calculating unit 102 calculates operation parameters (coefficients) of an interpolation polynomial used in interpolation by the interpolating unit 107 in accordance with the LUT and stores them as a data table in the main memory 908.

The interpolation calculation formulas (1) to (6) shown in FIG. 14 include coordinate values "δr", "δg" and "δb" within the cube, which are parameters associated with the input color values (R-value, G-value and B-value), and differences "Δδrδg (=|δr−δg|)", "Δδgδb" and "δbδr" between the respective coordinate values.

That is, in the case where a system of inputting the color values themselves of the output color space into the interpolation calculation formula is used, both the coefficient and calculation formula must be switched in accordance with the triangular pyramidal area corresponding to the input color, in carrying out interpolation calculation. When it is realized by hardware, the hardware maybe complicated. Also, even when the switching of the coefficient and calculation formula is realized by software, branch processing must be inserted in the program in order to switch the calculation formula and there is a risk that pipeline stall may occur within the CPU, thus lowering the performance.

Therefore, in the interpolation calculation by the interpolating unit 107 in this embodiment, a polynomial that includes "δr", "δg", "δb", "Δδrδg", "Δδgδb" and "Δδbδr", which are input-dependent variables included the formulas (1) to (6) in FIG. 14, and a constant term, is used as an interpolation calculation formula. Thus, a common calculation formula is applied to all the six types of triangular pyramidal areas acquired by the division of the cubic area, and therefore branching of the program is avoided and monistic management of the coefficients of the conversion polynomial is realized (see FIG. 15).

The calculation of the coefficients of the conversion polynomial by the coefficient calculating unit 102 in this embodiment follows the procedures of, with respect to a cubic lattice in the three-dimensional LUT having RGB as its inputs, shifting the division point for the B-component forward one by one, then returning the B-component to 0 when the end of the B-component has reached the division point, then shifting the division point for the G-component forward by one, and shifting the division point for the R-component forward by one when the edge of the G-component has reached the division point. Thus, the calculated coefficients are stored into a one-dimensional LUT. As the data stored for each division point, the coefficients of the polynomial in interpolation calculation with the four vertices of each pattern of triangular pyramidal area are generated in order of the pattern numbers of the plural triangular pyramidal areas shown in FIG. 5 and in order of C, M, Y and K. The coefficients are stored into the memory 906 by the coefficient storing unit 109. FIG. 16 is a view showing an exemplary data arrangement of the coefficient data and the like stored in the memory 906 for each output color component.

The reference area determining unit 104 receives number-of-division information for each of the RGB component axes with respect to the LUT from the table data acquiring unit 101, and determines the cubic area to which the input color value belongs, in accordance with the number of divisions. Specifically, each color component of the inputted RGB data is divided by the number of divisions and the position of the corresponding cubic area is calculated.

The small area determining unit 105 determines which triangular pyramidal area the input color value belongs to, of the six types of triangular pyramidal areas acquired by the division of the cubic area shown in FIG. 4, and selects the division points that are the four vertices of the determined triangular pyramidal area. As the positional relation, the number coincident with the pattern number in FIG. 4 is acquired by the following equation, where it is defined that comparative calculation A>=B of integers A and B results in "1" when A is a value equal to or larger than B, and "0" when it is otherwise. In the small area determining unit 105, the pattern number for selecting the vertices are calculated based on the following equation.

$$\text{Pattern number} = 4 \times \delta rg + 2 \times \delta gb + \delta br \qquad (7)$$

The conversion polynomial parameter address deriving unit 106a calculates the addresses in the memory 906 where the coefficients area stored, using the results of the processing by the reference area determining unit 104 and the small area determining unit 105, in order to load the polynomial coefficients at the time of interpolation calculation to the register 902. The calculation of the addresses in this processing is expressed as follows, where the numbers of divisions in the three-dimensional LUT are "divr", "divg" and "divb", the data size of the interpolation calculation coefficient when it is stored is "sizeof(param)", and the color values of the RGB components of the input data are "R", "G" and "B".

$$\begin{aligned}\text{Conversion polynomial parameter storage address} = \\ 8(\text{terms}) \times sizeof(param) \times 4(\text{colors}) \times \\ (divg \times divb \times R + divb \times G + B + \text{pattern number})\end{aligned} \qquad (8)$$

The interpolating unit 107 calculates the output color value by the interpolation calculation with the polynomial shown in FIG. 15, using the coefficients loaded to the register 902 by the conversion polynomial parameter loading unit 106b and the input color values. In the above calculation, the input value-dependent variables "δr", "δg", "δb", "Δδrδg", "Δδgδb" and "Δδbδr" are calculated. "δr", "δg" and "δb" are the remainders resulting from dividing the input color components R, G and B by "divr", "divg" and "divb" that divide the respective axes of the LUT. "Δδrδg", "Δδgδb" and "Δδbδr" are the absolute values of the differences "δrδg", "Δδgδb" and "Δδbδr".

Figure 17:
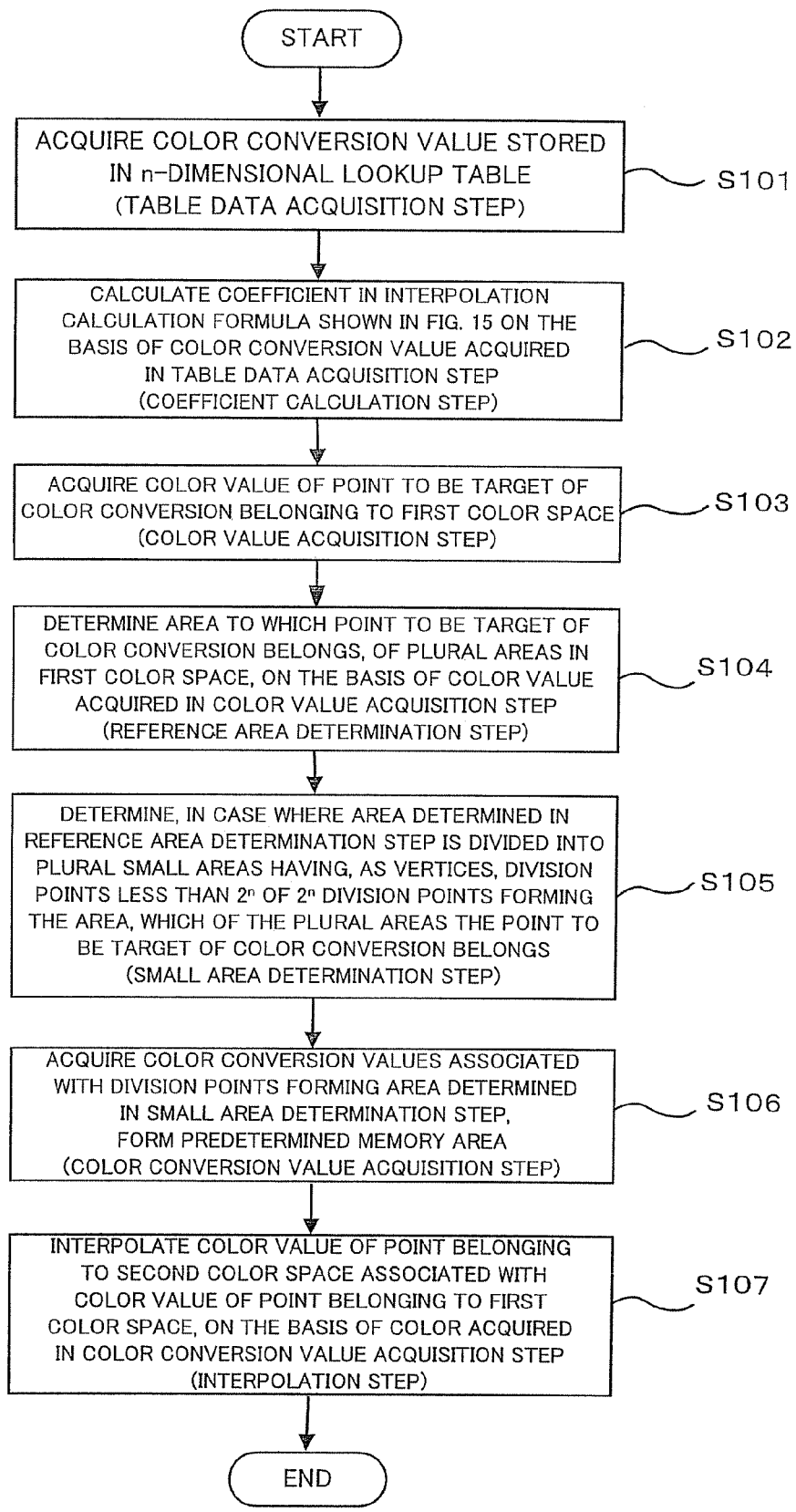
FIG. 17 is a flowchart for explaining a flow of processing in the color conversion apparatus according to the first embodiment of the invention.

FIG. 17 is a flowchart for explaining a flow of the processing (color conversion method) in the color conversion apparatus according to this embodiment.

The table data acquiring unit 101 acquired a color conversion value stored in the n-dimensional lookup table (table data acquisition step) (S101).

The coefficient calculating unit 102 calculates the coefficient in the interpolation calculation formula shown in FIG. 15 on the basis of the color conversion value acquired in the table data acquisition step (coefficient calculation step) (S102).

The color value acquiring unit 103 acquires the color value of a point to be a target of color conversion that belongs to the first color space (color value acquisition step) (S103).

The reference area determining unit 104 determines an area to which the point to be a target of color conversion belongs, of the plural areas in the first color space, on the basis of the color value acquired in the color value acquisition step (reference area determination step) (S104).

The small area determining unit 105 determines, in the case where the area determined in the reference area determination step is divided into plural small areas having, as vertices, division points less than $2^n$ of $2^n$ division points forming the area, which of the plural small areas the point to be a target of color conversion belongs to (small area determination step) (S105).

The color conversion value acquiring unit 106 acquires the color conversion values associated with the division points forming the area determined by the small area determination step, from a predetermined memory area (color conversion value acquisition step) (S106).

The interpolating unit 107 interpolates the color value of a point belonging to the second color space that corresponds to the color value of the point belonging to the first color space, on the basis of the color conversion value acquired in the color conversion value acquisition step (interpolation step) (S107). In the interpolation step, interpolation of the color value of the point belonging to the second color space is carried out by using a common operation formula except for the coefficient with respect to each of the plural small areas, on the basis of the color value of the point belonging to the first color space as the target of color conversion and the color conversion values associated with the plural division points forming the vertices of each of the plural small areas.

As the lookup table is stored with the data arrangement as described in this embodiment, there can be an increased probability that the data to be used exists in the cache memory when reading data from the cache memory. Thus, the necessary data can be efficiently acquired by one memory access. Since the number of accesses to the memory is significantly reduced, the overall processing speed can be improved.

Also, as the interpolation calculation formula with the monistically managed coefficients is used, complication of the hardware and occurrence of pipeline stall in the CPU can be avoided. Moreover, since the coefficients that have been found in advance are used in the operation formula used for processing, it can contribute to reduction in the processing load.

Also, while the data loading of the multi-dimensional LUT to the register is executed as separate processing from the interpolation in this embodiment, it is also possible to employ a configuration in which the data is loaded when the color value is required at the time of interpolation calculation.

Second Embodiment

Next, a second embodiment of the invention will be described.

This embodiment is a modification of the above-described first embodiment. Hereinafter, the parts having similar functions to those described already in the first embodiment are denoted by the same numerals and will not be described further in detail.

In the color conversion value acquiring unit 106 in this embodiment, the color conversion value acquired from the main memory 908 on the basis of the result of the determination by the small area determining unit 105 is exactly the color value of the point belonging to the second color space (CMYK color space).

Thus, the interpolating unit 107 in this embodiment carries out interpolation calculation by using the formulas (1) to (6) shown in FIG. 14, and by using the input color value acquired by the color value acquiring unit 103 and the color value in the CMYK color space acquired by the color conversion value acquiring unit 106, as input values.

Third Embodiment

Next, a third embodiment of the invention will be described.

This embodiment is a modification of the above-described first embodiment. Hereinafter, the parts having similar functions to those described already in the first embodiment are denoted by the same numerals and will not be described further in detail.

Figure 18:
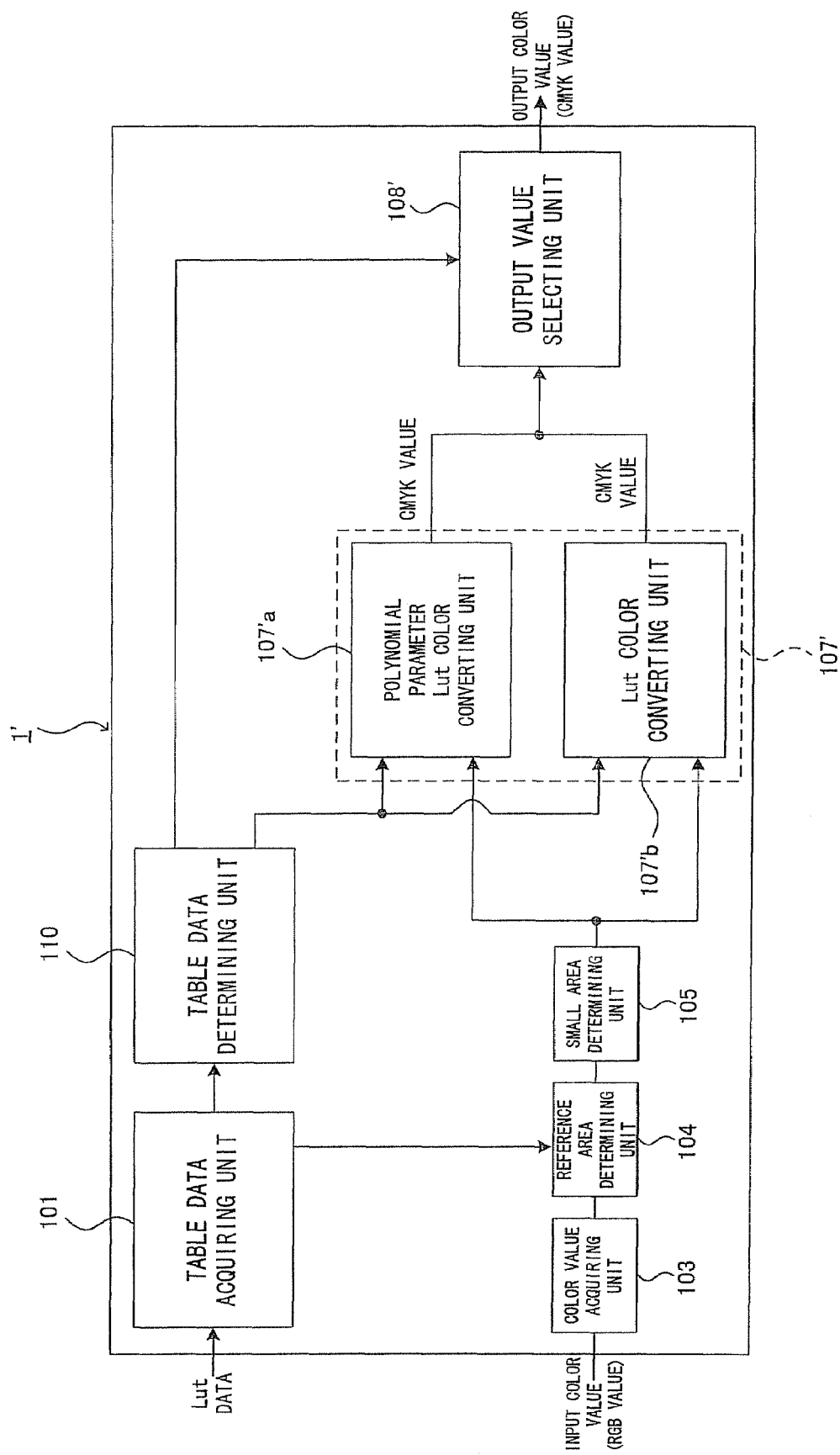
FIG. 18 is a functional block diagram showing the configuration of a color conversion apparatus according to a third embodiment of the invention.

FIG. 18 is a functional block diagram showing the configuration of a color conversion apparatus according to the third embodiment of the invention. A color conversion apparatus 1' according to this embodiment has a interpolating unit 107' instead of the interpolating unit 107 in the configurations of the above first and second embodiments. The interpolating unit 107' has a polynomial parameter LUT color converting unit 107'$a$ and a LUT color converting unit 107'$b$. The color conversion apparatus 1' also has a table data determining unit 110 and an output value selecting unit 108'.

The table data determining unit 110 determines which of the coefficient and the color value of a point belonging to the second color space, the color conversion value acquired by the table data acquiring unit 101 (data stored on the lookup table to be inputted) is.

In the case where it is determined by the table data determining unit 110 that the color conversion value acquired by the table data acquiring unit 101 is the "coefficient" in the interpolation calculation formula, the interpolating unit 107' causes the output value selecting unit 108' to output the result of interpolation using the operation formula shown in FIG. 15. In the case where it is determined that the color conversion value is the color value of a point belonging to the second color space, the interpolating unit causes the output value selecting unit 108' to output the result of interpolation using the color value.

Thus, whether the lookup table storing the color value in the output color space or the lookup table storing the coefficient of the interpolation calculation formula is acquired as a lookup table, color conversion processing corresponding to the acquired data can be carried out.

As the function of calculating the parameter based on the provided LUT is provided in this manner, it is possible to flexibly cope with the cases where the LUT is provided in various data formats such as ICC profile format and CRD format.

Figure 19:
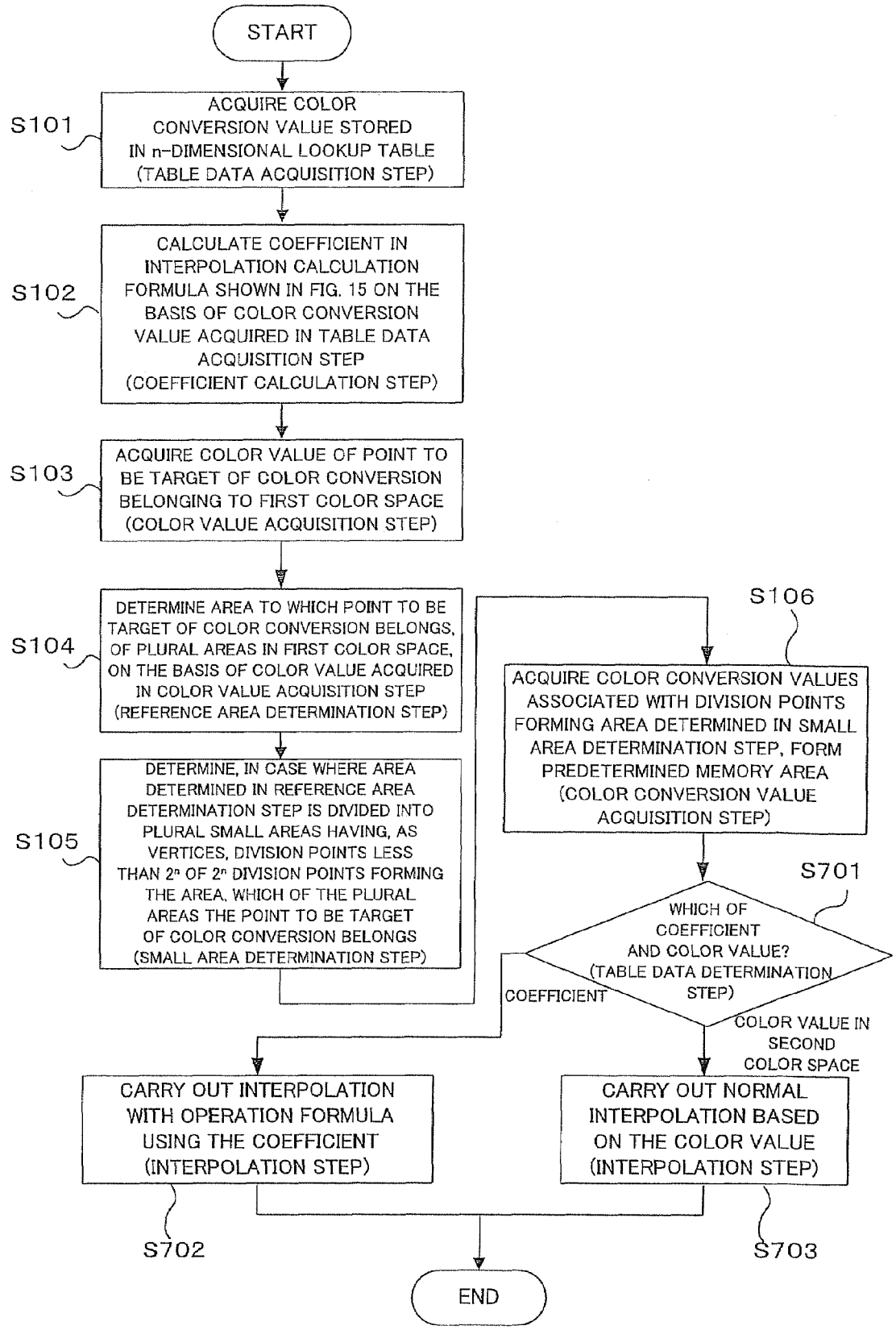
FIG. 19 is a flowchart showing a flow of processing (color conversion method) in the third embodiment of the invention.
Figure 23:
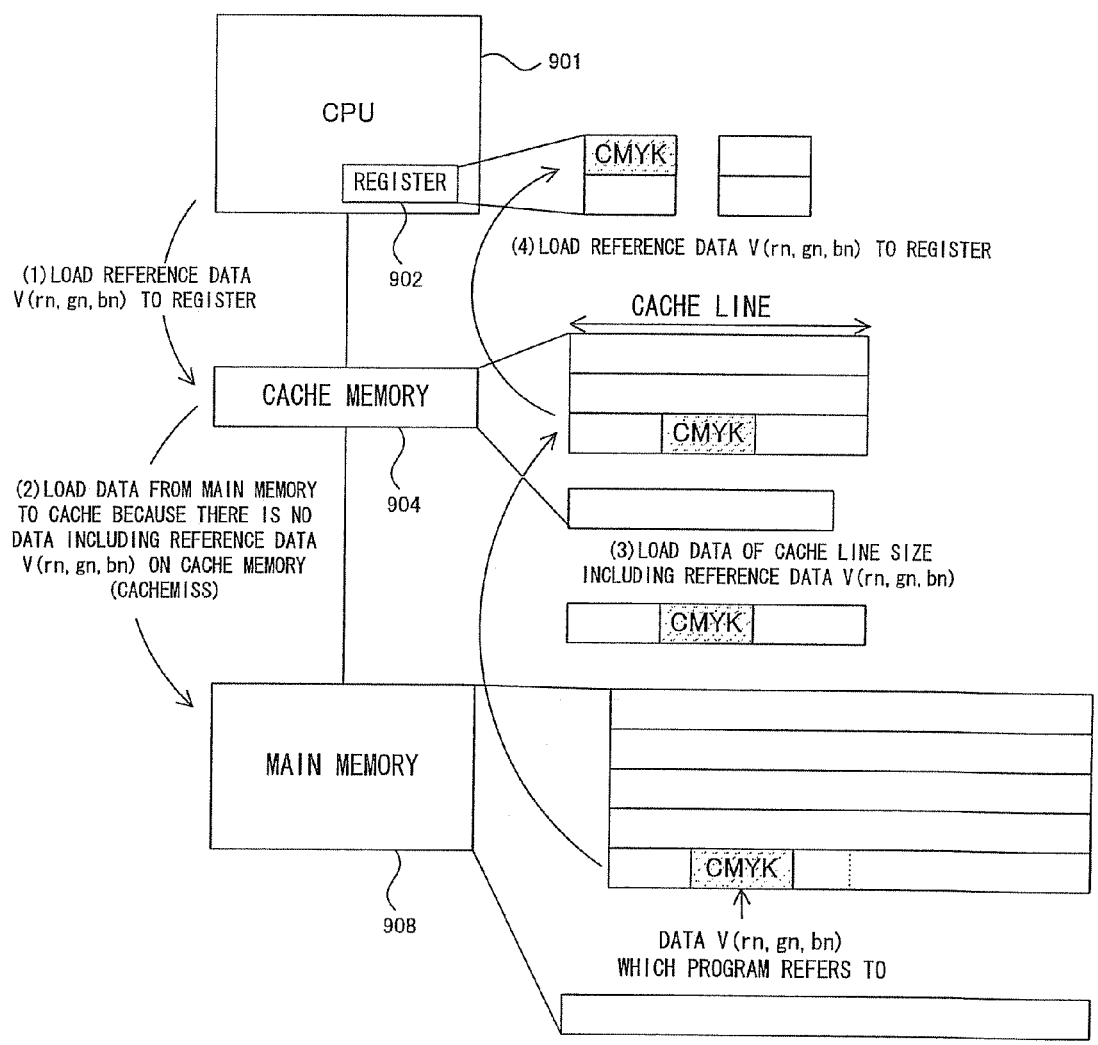
FIG. 23 is a view for explaining operations of a CPU, a memory, a cache memory and the like in interpolation.
Figure 24:
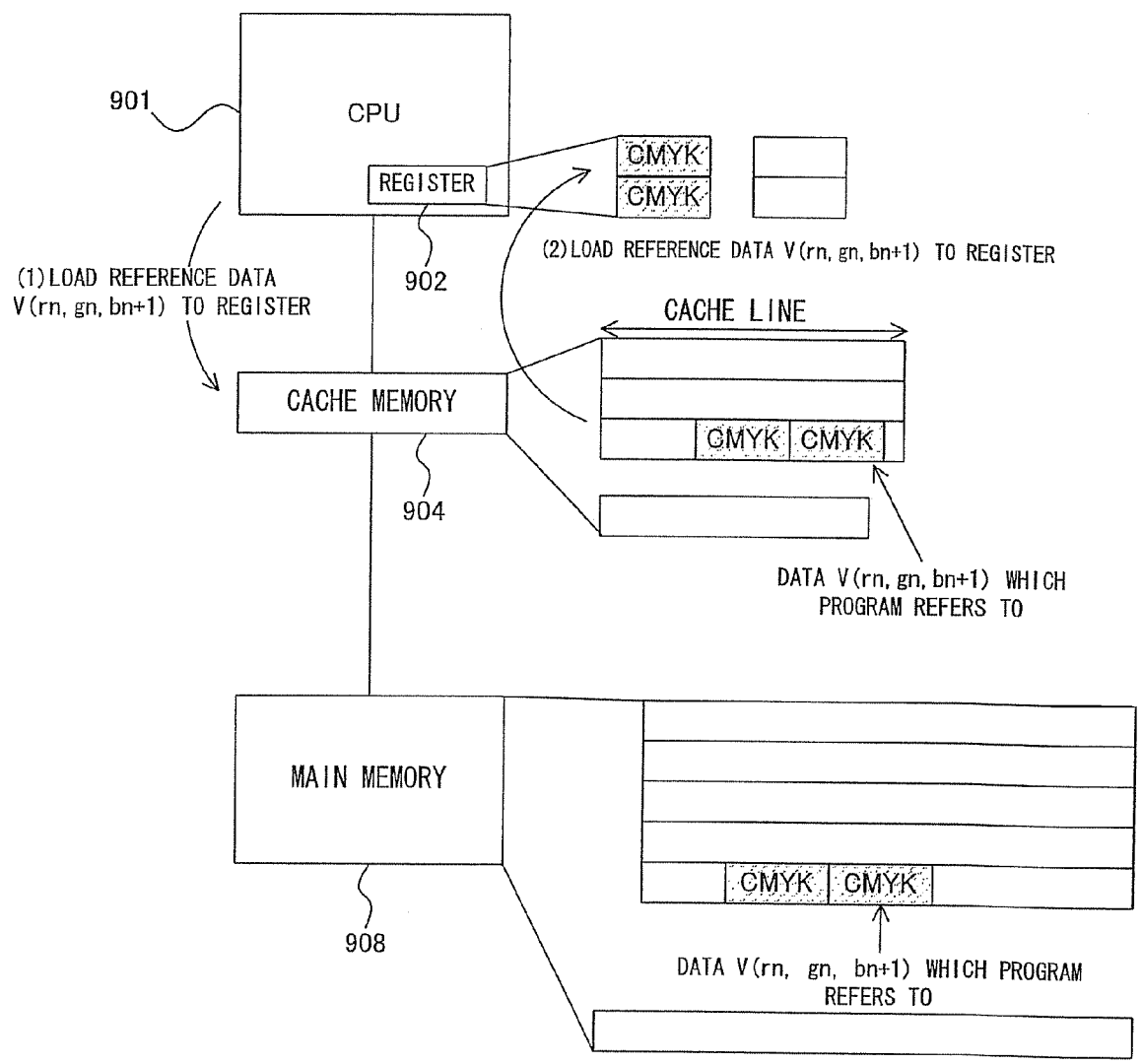
FIG. 24 is a view for explaining operations of a CPU, a memory, a cache memory and the like in interpolation.

FIG. 19 is a flowchart showing a flow of processing (color conversion method) in the third embodiment of the invention. The table data acquisition step (S101), the color value acquisition step (S103), the reference area determination step (S104), the small area determination step (S105) and the color conversion value acquisition step (S106) are the same as the processing that has already been described with reference to FIG. 17 and therefore will not be described further in detail.

The table data determining unit 110 determines which of the coefficient and the color value of a point belonging to the second color space, the color conversion value acquired in the table data acquisition step is (table data determination step) (S701).

In an interpolation step, in the case where it is determined in the table data determination step that the color conversion value acquired in the table data acquisition step is the coefficient, interpolation is carried out with the operation formula (S702). In the case where it is determined that the color conversion value is the color value of a point belonging to the second color space, interpolation is carried out with the color value (S703).

Also, in the above embodiments, the configurations in which an input value (input color space) to be a target of color conversion processing is three-dimensional while the dimension of an output value (output color space) is not defined, are used as convenient examples for explanation. However, the invention is not limited to these and it is also possible to use, for example, a color expressed in a one-dimensional, twodimensional, or four- or more-dimensional color space, as a target (input color) of color conversion processing.

In the embodiments, the case where the function to carry out the invention has already been recorded within the apparatus is described. However, the invention is not limited to this and the similar function may be downloaded to the apparatus from a network or the similar function stored in a recording medium may be installed into the apparatus. As a recording medium, any form of recording medium that can store a program and that can be read by the apparatus may be used, such as a CD-ROM. Also, the function acquired in advance by installation or downloading may be realized in cooperation with the operating system (OS) in the apparatus.

The present invention has been described in detail in accordance with the specific embodiments. However, it is obvious to those skilled in the art that various changes and modifications can be made without departing from the spirit and scope of the invention.

As described above in detail, according to the invention, a technique can be provided that can realize improvement in memory access efficiency and reduction in the processing volume in interpolation with respect to color conversion processing using a two- or more-dimensional lookup table.

What is claimed is:

1. A color conversion apparatus in which, in accordance with an n-dimensional lookup table that stores a color conversion value corresponding to each of division points dividing each color component axis in a first color space realized by n types (n is an integer of one or larger) of color components, into plural sections, and thereby dividing the first color space into plural areas, a color value of a point belonging to the first color space is converted to a color value of a point belonging to a second color space, the apparatus comprising:
a color value acquiring unit configured to acquire a color value of a point belonging to the first color space that is to be a target of color conversion;
a reference area determining unit configured to determine an area to which the point to be the target of color conversion belongs, from the plural areas in the first color space, in accordance with the color value acquired by the color value acquiring unit;
a small area determining unit configured to, in the case where the area determined by the reference area determining unit is divided into plural areas having, as vertices, division points less than $2^n$ of $2^n$ division points forming the area, determine which one of the plural small areas the point to be the target of color conversion belongs to;
a color conversion value acquiring unit configured to acquire a color conversion value associated with a division point forming the area determined by the small area determining unit, from a predetermined memory area; and
an interpolating unit configured to interpolate the color value of the point belonging to the second color space corresponding to the color value of the point belonging to the first color space in accordance with the color conversion value acquired by the color conversion value acquiring unit;
wherein plural color conversion values associated respectively with the plural division points forming the small area in the n-dimensional lookup table are stored in the predetermined memory area with their storage addresses next to each other.

2. The color conversion apparatus according to claim 1, wherein the color conversion value is the color value of a point belonging to the second color space.

3. The color conversion apparatus according to claim 1, wherein the interpolating unit carries out interpolation calculation of the color value of a point belonging to the second color space by using a common operation formula except for its coefficient with respect to each of the plural small areas, on the basis of the color of a point belonging to the first color space, which is a target of color conversion, and the color conversion values associated with the plural division points forming vertices of each of the plural small areas, and
the color conversion value is a coefficient in the operation formula.

4. The color conversion apparatus according to claim 3, comprising:
a table data acquiring unit configured to acquire a color conversion value stored in the n-dimensional lookup table; and
a coefficient calculating unit configured to calculate the coefficient on the basis of the color conversion value acquired by the table data acquiring unit.

5. The color conversion apparatus according to claim 3, comprising:
a table data acquiring unit configured to acquire a color conversion value stored in the n-dimensional lookup table; and
a table data determining unit configured to determine which of the coefficient and the color value of a point belonging to the second color space, the color conversion value acquired by the table data acquiring unit is;
wherein the interpolating unit carries out interpolation calculation using the operation formula in the case where it is determined by the table data determining unit that the color conversion value acquired by the table data acquiring unit is the coefficient, and the interpolating unit carries out interpolation calculation using the color value in the case where it is determined that the color conversion value is the color value of a point belonging to the second color space.

6. The color conversion apparatus according to claim 1, wherein n=3 holds, and
the small area is a triangular pyramidal area having four division points as its vertices.

7. A color conversion method in which, in accordance with an n-dimensional lookup table that stores a color conversion value corresponding to each of division points dividing each color component axis in a first color space realized by n types (n is an integer of one or larger) of color components, into plural sections, and thereby dividing the first color space into plural areas, a color value of a point belonging to the first color space is converted to a color value of a point belonging to a second color space, the method comprising the steps of:
acquiring a color value of a point belonging to the first color space that is to be a target of color conversion;
determining an area to which the point to be the target of color conversion belongs, from the plural areas in the first color space, in accordance with the color value acquired in the step of acquiring the color value;
in the case where the area determined in the step of determining the area is divided into plural areas having, as vertices, division points less than $2^n$ of $2^n$ division points forming the area, determining which one of the plural small areas the point to be the target of color conversion belongs to;
acquiring a color conversion value associated with a division point forming the area determined in the step of determining the small area, from a predetermined memory area; and
interpolating the color value of the point belonging to the second color space corresponding to the color value of the point belonging to the first color space in accordance with the color conversion value acquired in the step of acquiring the color conversion value;

wherein plural color conversion values associated respectively with the plural division points forming the small area in the n-dimensional lookup table are stored in the predetermined memory area with their storage addresses next to each other.

8. The color conversion method according to claim 7, wherein the color conversion value is the color value of a point belonging to the second color space.

9. The color conversion method according to claim 7, wherein the step of interpolating is to carry out interpolation calculation of the color value of a point belonging to the second color space by using a common operation formula except for its coefficient with respect to each of the plural small areas, on the basis of the color value of a point belonging to the first color space, which is a target of color conversion, and the color conversion values associated with the plural division points forming vertices of each of the plural small areas, and the color conversion value is a coefficient in the operation formula.

10. The color conversion method according to claim 9, comprising the steps of:

acquiring a color conversion value stored in the n-dimensional lookup table; and calculating the coefficient on the basis of the color conversion value acquired in the step of acquiring the table data.

11. The color conversion method according to claim 9, comprising the steps of:

acquiring a color conversion value stored in the n-dimensional lookup table; and determining which of the coefficient and the color value of a point belonging to the second color space, the color conversion value acquired in the step of acquiring the table data is;

wherein the step of interpolating is to carry out interpolation calculation using the operation formula in the case where it is determined in the step of determining the table data that the color conversion value acquired in the step of acquiring the table data is the coefficient, and to carry out interpolation calculation using the color value in the case where it is determined that the color conversion value is the color value of a point belonging to the second color space.

12. The color conversion method according to claim 7, wherein n=3 holds, and the small area is a triangular pyramidal area having four division points as its vertices.

13. A recording medium storing a color conversion program that causes a computer to execute processing in which, in accordance with an n-dimensional lookup table that stores a color conversion value corresponding to each of division points dividing each color component axis in a first color space realized by n types (n is an integer of one or larger) of color components, into plural sections, and thereby dividing the first color space into plural areas, a color value of a point belonging to the first color space is converted to a color value of a point belonging to a second color space, the program causing the computer to execute the steps of:

acquiring a color value of a point belonging to the first color space that is to be a target of color conversion;

determining an area to which the point to be the target of color conversion belongs, from the plural areas in the first color space, in accordance with the color value acquired in the step of acquiring the color value;

in the case where the area determined in the step of determining the area is divided into plural areas having, as vertices, division points less than $2^n$ of $2^n$ division points forming the area, determining which one of the plural small areas the point to be the target of color conversion belongs to;

acquiring a color conversion value associated with a division point forming the area determined in the step of determining the small area, from a predetermined memory area; and interpolating the color value of the point belonging to the second color space corresponding to the color value of the point belonging to the first color space in accordance with the color conversion value acquired in the step of acquiring the color conversion value;

wherein plural color conversion values associated respectively with the plural division points forming the small area in the n-dimensional lookup table are stored in the predetermined memory area with their storage addresses next to each other.

14. The recording medium storing the color conversion program according to claim 13, wherein the color conversion value is the color value of a point belonging to the second color space.

15. The recording medium storing the color conversion program according to claim 13, wherein the step of interpolating is to carry out interpolation calculation of the color value of a point belonging to the second color space by using a common operation formula except for its coefficient with respect to each of the plural small areas, on the basis of the color of a point belonging to the first color space, which is a target of color conversion, and the color conversion values associated with the plural division points forming vertices of each of the plural small areas, and the color conversion value is a coefficient in the operation formula.

16. The recording medium storing the color conversion program according to claim 15, comprising the steps of:

acquiring a color conversion value stored in the n-dimensional lookup table; and calculating the coefficient on the basis of the color conversion value acquired in the step of acquiring the table data.

17. The recording medium storing the color conversion program according to claim 15, comprising the steps of:

acquiring a color conversion value stored in the n-dimensional lookup table; and determining which of the coefficient and the color value of a point belonging to the second color space, the color conversion value acquired in the step of acquiring the table data is;

wherein the step of interpolating is to carry out interpolation calculation using the operation formula in the case where it is determined in the step of determining the table data that the color conversion value acquired in the step of acquiring the table data is the coefficient, and to carry out interpolation calculation using the color value in the case where it is determined that the color conversion value is the color value of a point belonging to the second color space.

18. The recording medium storing the color conversion program according to claim 13, wherein n=3 holds, and the small area is a triangular pyramidal area having four division points as its vertices.

* * * * *